United States Patent [19]

Batey

[11] Patent Number: 5,758,488
[45] Date of Patent: Jun. 2, 1998

[54] CORE FLOW EXPANSION CHAMBER DEVICE SYSTEM FOR REDUCTION OF JET TURBINE ENGINE NOISE

[75] Inventor: J. Gary Batey, Cordova, Tenn.

[73] Assignee: Roderick Thomson, New York, N.Y.

[21] Appl. No.: 60,389

[22] Filed: May 11, 1993

[51] Int. Cl.$^6$ .................... F02K 1/00; F02K 3/04
[52] U.S. Cl. .................... 60/226.1; 60/262; 181/213; 181/217; 181/220; 239/265.13
[58] Field of Search .................... 60/226.1, 262, 60/263; 191/213, 214, 219, 220; 239/127.3, 265.11, 265.13; 181/215, 216, 217

[56] References Cited

U.S. PATENT DOCUMENTS

| | | | |
|---|---|---|---|
| 2,931,171 | 4/1960 | Tyler et al. | 60/35.54 |
| 2,934,889 | 5/1960 | Poulos | 60/35.6 |
| 2,940,252 | 6/1960 | Reinhart | 60/35.54 |
| 2,943,444 | 7/1960 | Baxter | 60/35.54 |
| 2,988,302 | 6/1961 | Smith | 244/15 |
| 3,061,038 | 10/1962 | Lawler et al. | 181/215 |
| 3,062,818 | 11/1962 | Schaefer et al. | 260/248 |
| 3,065,818 | 11/1962 | Lombard et al. | 181/33 |
| 3,174,282 | 3/1965 | Harrison | 181/215 |
| 3,227,240 | 1/1966 | Lee et al. | 181/51 |
| 3,289,413 | 12/1966 | Gist, Jr. | 60/263 |
| 3,455,413 | 7/1969 | Henley | 181/51 |
| 3,508,403 | 4/1970 | Neitzel | 60/226 |
| 3,542,152 | 11/1970 | Adamson et al. | 181/50 |
| 3,579,993 | 5/1971 | Tanner | 60/262 |
| 3,598,318 | 8/1971 | Schiel | 239/265.13 |
| 3,696,617 | 10/1972 | Ellis | 60/229 |
| 3,710,890 | 1/1973 | True et al. | 181/220 |
| 3,819,009 | 6/1974 | Motsinger | 181/33 G |
| 3,886,737 | 6/1975 | Grieb | 60/226 R |
| 3,893,640 | 7/1975 | Hull, Jr. | 244/54 |
| 3,954,224 | 5/1976 | Colebrook et al. | 239/265.13 |
| 3,982,696 | 9/1976 | Gordon | 239/265.17 |
| 4,003,249 | 1/1977 | Laskody | 73/117.4 |
| 4,030,291 | 6/1977 | Sargisson | 60/226 A |
| 4,045,957 | 9/1977 | DiSabato | 60/262 |
| 4,077,206 | 3/1978 | Ayyagari | 60/262 |
| 4,086,761 | 5/1978 | Schaut et al. | 60/226 R |
| 4,117,671 | 10/1978 | Neal et al. | 60/262 |
| 4,127,756 | 11/1978 | Peterson et al. | 200/153 |
| 4,135,363 | 1/1979 | Packman | 60/262 |
| 4,137,992 | 2/1979 | Herman | 181/213 |

(List continued on next page.)

FOREIGN PATENT DOCUMENTS 2123486  2/1984  United Kingdom .................... 60/262

OTHER PUBLICATIONS

Bernhard H. Goethert, *Noise Attenuation and Associated Thrust Increase of Turbojet Engines Through Hyper-Mixing Ejector Shrouds*, Fifth International Symposium on Air Breathing Engines: Symposium Papers 17–1 (1981).

F.H. Pond and R.A. Heinz, *JT8D Engine Internal Exhaust Mixer Technology Program: Final Report*, Rpt. No. FAA–80–69 (1980) (prepared for U.S. Dept. of Transportation, Federal Aviation Administration).

(List continued on next page.)

*Primary Examiner*—Timothy Thorpe
*Assistant Examiner*—Ted Kim
*Attorney, Agent, or Firm*—Kenyon & Kenyon

[57] ABSTRACT

A noise reduction system is provided for installation on a bypass turbine having a core engine, an outer casing and a thrust reverser. The system is comprised of an acoustically treated nose cowl conventional for the engine; a respaced inlet guide vane upstream of the core engine for reducing wake disturbances striking the engine fan; a flow diverter downstream of the core engine for turning fan air inward toward the engine center line and for turning core air outward; a structure for supporting and positioning said flow diverter relative to the engine; a core flow expansion chamber device for slowing the peak velocity of the exhaust gas prior to exhausting it to the atmosphere; and an acoustic tailpipe assembly configured to define an outlet area sized and shaped to compensate for the mass flow loss created by the core flow expansion chamber device.

8 Claims, 7 Drawing Sheets

U.S. PATENT DOCUMENTS

| | | | |
|---|---|---|---|
| 4,149,375 | 4/1979 | Wynosky et al. | 60/262 |
| 4,165,609 | 8/1979 | Rudolph | 60/262 |
| 4,215,536 | 8/1980 | Rudolph | 60/262 |
| 4,217,756 | 8/1980 | Laskody | 60/262 |
| 4,226,085 | 10/1980 | Johnson | 60/262 |
| 4,227,370 | 10/1980 | Kirker | 60/262 |
| 4,235,303 | 11/1980 | Dhoore et al. | 181/214 |
| 4,240,252 | 12/1980 | Sargisson et al. | 60/262 |
| 4,244,441 | 1/1981 | Tolman | 181/213 |
| 4,289,984 | 9/1981 | Bhat et al. | 60/226.1 |
| 4,291,782 | 9/1981 | Klees | 181/215 |
| 4,292,803 | 10/1981 | Prior | 60/230 |
| 4,335,573 | 6/1982 | Wright | 60/261 |
| 4,384,634 | 5/1983 | Shuttleworth | 181/213 |
| 4,401,269 | 8/1983 | Eiler | 239/265.17 |
| 4,422,524 | 12/1983 | Osborn | 181/215 |
| 4,433,751 | 2/1984 | Bonneau | 181/213 |
| 4,449,607 | 5/1984 | Forestier et al. | 181/213 |
| 4,452,335 | 6/1984 | Mathews et al. | 181/214 |
| 4,501,393 | 2/1985 | Klees et al. | 239/265.13 |
| 4,516,660 | 5/1985 | Greenlaw | 181/296 |
| 4,696,159 | 9/1987 | Horgan | 60/226.1 |
| 4,723,626 | 2/1988 | Carr et al. | 181/213 |
| 4,751,979 | 6/1988 | Wiseman | 181/213 |
| 4,754,924 | 7/1988 | Shannon | 239/127.3 |
| 4,759,513 | 7/1988 | Birbragher | 244/1 |
| 4,836,469 | 6/1989 | Wagenfeld | 244/1 |
| 4,909,346 | 3/1990 | Torkelson | 181/213 |
| 4,979,587 | 12/1990 | Hirt et al. | 181/213 |
| 5,014,815 | 5/1991 | Arcas et al. | 181/213 |
| 5,058,703 | 10/1991 | Ealba et al. | 181/228 |
| 5,127,602 | 7/1992 | Batey et al. | 244/1 |
| 5,133,194 | 7/1992 | Army, Jr. | 62/401 |
| 5,154,052 | 10/1992 | Giffin et al. | 60/262 |
| 5,157,916 | 10/1992 | Wynosky et al. | 60/204 |
| 5,167,118 | 12/1992 | Torkelson | 181/213 |

OTHER PUBLICATIONS

F.G. Strout and A. Atencio Jr., *Flight Effects on Noise Generated by a JT8D Engine with Inverted Primary/Fan Flow,* Journal of Aircraft, Jan. 1980, at 13.

General Electric Co., *High Velocity Jet Noise Source Location and Reduction: Task 6—Noise Abatement Nozzle Design Guide,* Rpt. No. FAA–RD–76–79 (1979) (prepared for Dept. of Transportation, Federal Aviation Administration).

General Electric Co., *High Velocity Jet Noise Source Location and Reduction: Task 2—Theoretical Developments and Basic Experiments,* Rpt. No. FAA–RD–76–79 (1978) (prepared for Dept. of Transportation, Federal Aviation Administration).

A.B. Packman and D.C. Eiler, *Internal Mixer Investigation for JT8D Engine Jet Noise Reduction,* Rpt. No. FAA–RD–77–132 (1977) (prepared for Dept. of Transportation, Federal Aviation Administration).

*Nordman JT–8 Hushkit,* Flight International, Aug. 1990, at 6 (photograph of a new product).

*News Briefs,* Aviation Week, May 2, 1988, at 34 (announcing Pratt & Whitney hush kit using mixer).

*Airline Observer,* Aviation Week, Oct. 3, 1988, at 13 (announcing Quiet Nacelle Corp. JT8D hush kit).

David Woolley, *Hush–kit Manufacturers Scramble to Equip Older Jets,* Interavia, Jun. 1985, at 634.

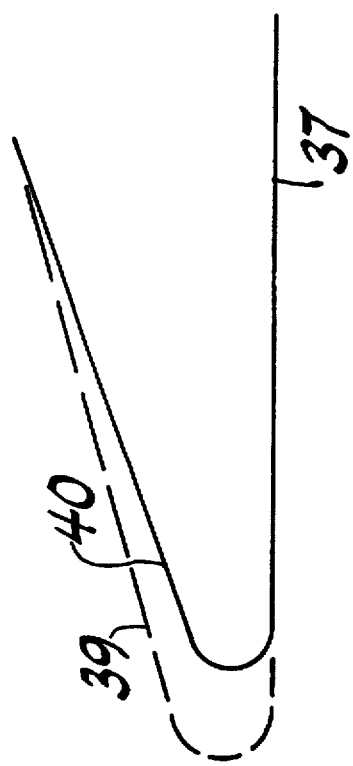
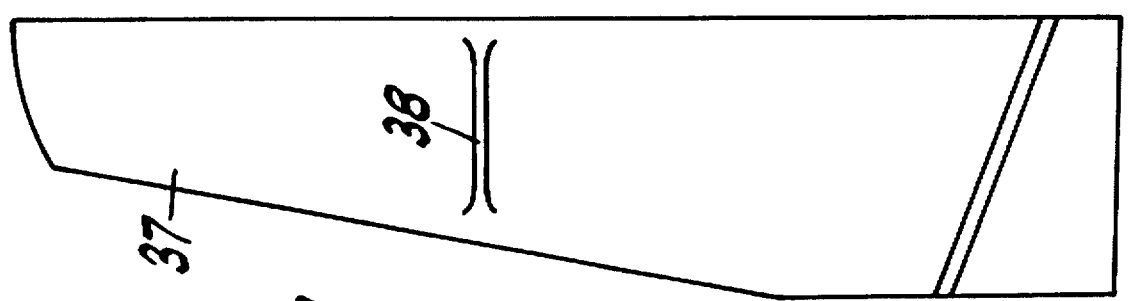

CORE FLOW EXPANSION CHAMBER DEVICE SYSTEM FOR REDUCTION OF JET TURBINE ENGINE NOISE

BACKGROUND OF THE INVENTION

1. Field of the Invention

The present invention relates generally to jet aircraft turbine engines and, more specifically, to a noise reduction system for retrofit on an existing engine and airframe.

2. Description of the Related Art

In view of noise restrictions placed upon the use of aircraft, a need has existed and continues to exist for quiet aircraft engines. Due to these noise restrictions, there is a significant need for a method to modify conventional engines on aircraft that presently are in service, since aircraft with such engines often cannot continued to be used.

The prior art contains many instances of structure adapted specifically for retrofit or original fit on a jet turbine engine to suppress engine noise. Typically, the noise suppression structure consists of sound-attenuating liners applied to the nose cowl, the nose dome, and the fan duct components of the engine, a lobed mixer which mixes the core and fan flows to lower peak velocities, and in certain cases a suppressor device which draws in ambient air to be mixed with the turbine and fan flows. Examples of such installations are shown in U.S. Pat. Nos. 4,751,979, 4,723,626, 4,443,751 and 4,401,269. The installation of past prior noise suppression structures and devices in a retrofit application is generally extremely time consuming and detailed and has a significant negative impact on the aircraft. Many past systems also required significant preventative maintenance to maintain the beneficial effects of noise suppression.

In the applicants view, the past efforts to design a retrofit for aircraft engines to suppress noise levels have not been fully acceptable or successful, particularly on high thrust rated versions of these engines. Many of the past retrofit designs simply have not provided a meaningful noise reduction. Moreover, these past retrofit designs have often been prohibitively expensive and negatively impact the economic operation of the aircraft to a significant level.

SUMMARY OF THE INVENTION

Accordingly, it is an object of the present invention to provide a noise suppression system for retrofit installation on bypass type turbine engines which significantly reduce the noise from the engine perceived by ground observers, particularly during takeoff and approach operations. It is a further object of the present invention to provide a retrofit noise suppression system for a bypass turbine engine which has a minimal impact on the economic operation of the aircraft on which it is affixed.

It is a still further object of the present invention to provide a retrofit noise suppression system for a bypass turbine engine which can be installed with a minimum duration of down time and which can be easily maintained for future flight operations.

A still further object of the present invention is to provide a noise suppression system for retrofit installation on a bypass type turbine engine which is specifically adapted to maintain current back pressure levels in the exhaust gas stream, thereby significantly reducing any chance of fan stall.

Additional objects and advantages of the invention will be set forth in the description which follows, and in part will be obvious from the description, or may be learned by practice of the invention. The objects and advantages of the invention may be realized and attained by means of the elements and combinations particularly pointed out in the appended claims.

To achieve the foregoing objects, and in accordance with the purposes of the invention as embodied and broadly described herein, a noise suppression system for retrofit installation on a bypass type jet turbine engine having a core engine, an outer casing, and a thrust reverser is provided. The noise reduction system comprises flow diverter means, located downstream of the core engine, for turning fan air radially inward and core exhaust gases radially outward, means for supporting and positioning the flow diverter means relative to the engine outer casing, a core flow expansion chamber device for expanding and slowing the core flow prior to exhausting it through a defined area, a thrust reverser means to permit adequate reverse thrust with the core flow expansion chamber device in place, and an acoustic tailpipe assembly configured to define an outlet area for the engine fan flow path, the outlet area being sized and shaped to rematch pressure levels in the exhaust gas stream to compensate for the mass loss created by the core flow bleed off through the expansion chamber device.

In a preferred embodiment, the flow diverter means includes a flow diverter having an array of axially and radially elongated hot and cold chutes with fan air directed into the cold chutes and exhaust gas into the hot chutes. Hot exhaust gases from the core engine pass through the hot chutes of the flow diverter and enter the core flow expansion chambers. Fan air from the fan duct passes through the cold chutes of the flow diverter and enters the interior cylindrical section of the core flow expansion chamber device.

Preferably, a modified thrust reverser assembly is provided with the system to replace the conventional thrust reverser. The modified thrust reverser is adapted such that the core flow passed through the chamber device will be engaged by the thrust reverser during reverse operations.

In the preferred embodiment, a modified tailpipe is provided with the system to replace the conventional tailpipe. The modified tailpipe is sized to compensate for the flow diverter means being introduced into the flow stream and for the loss of mass flow through the core flow expansion chamber device, thereby reducing the mass flow passing through and exiting the tail pipe.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate a presently preferred embodiment of the invention and, together with the general description given below, serve to explain the principles of the invention.

IN THE DRAWINGS

Figure 1:
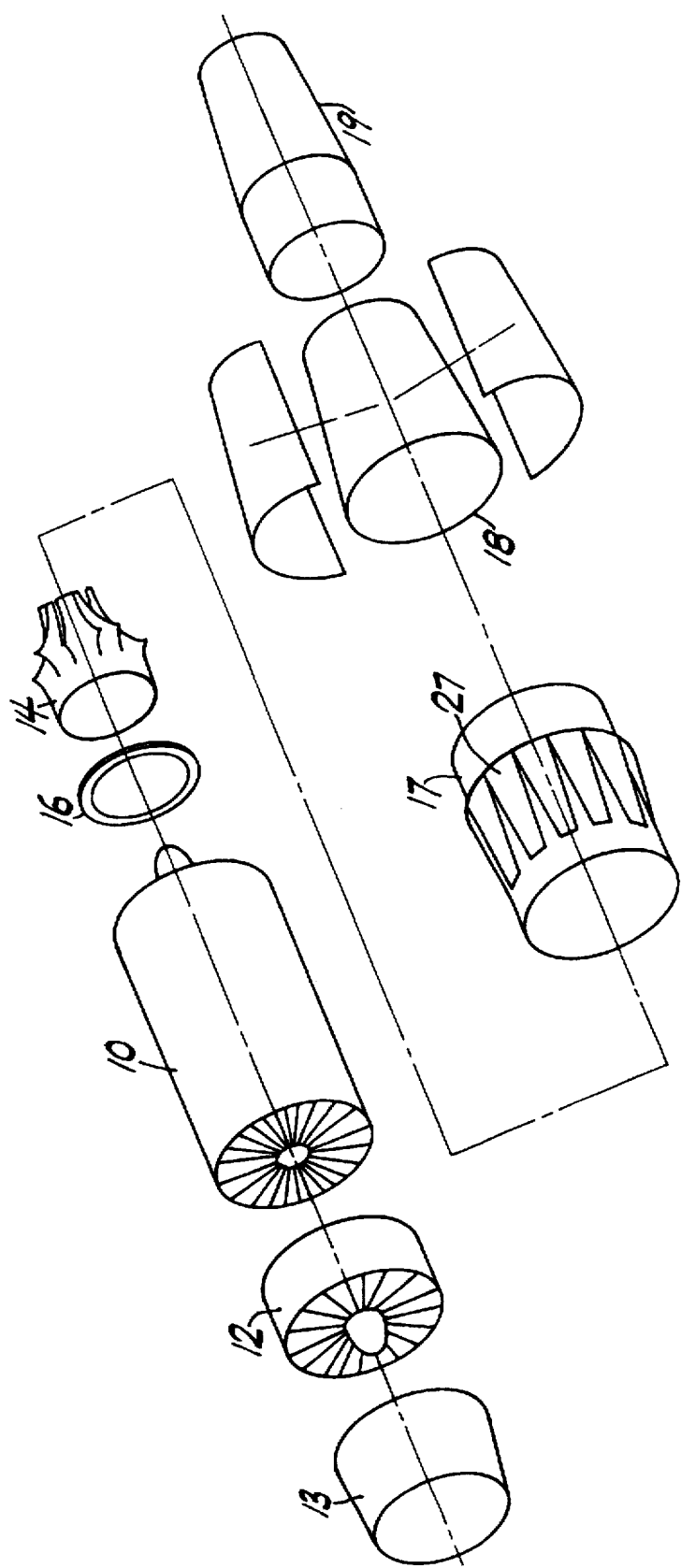

FIG. 1 is an exploded perspective view of the elements of the noise suppression system configured to fit on, for example, a Douglas Corporation DC-9 or Boeing 737-100 or -200 aircraft in relation to the engine.

Figure 2:
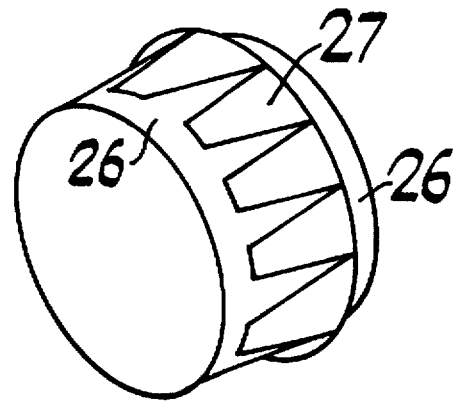

FIG. 2 is a perspective view illustrating a core flow expansion chamber device of the present invention.

Figure 3:
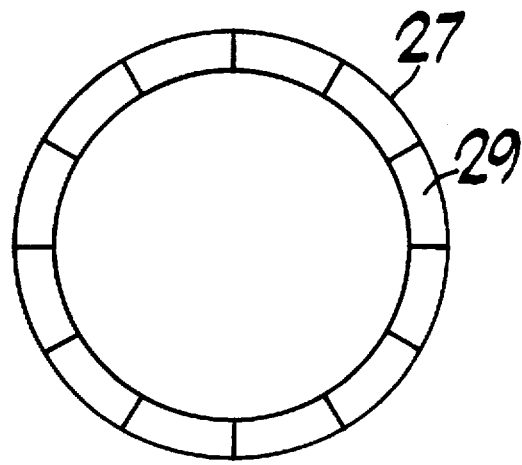

FIG. 3 is a rear axial view of the core flow expansion chamber device of the present invention.

Figures 4A, 4B:
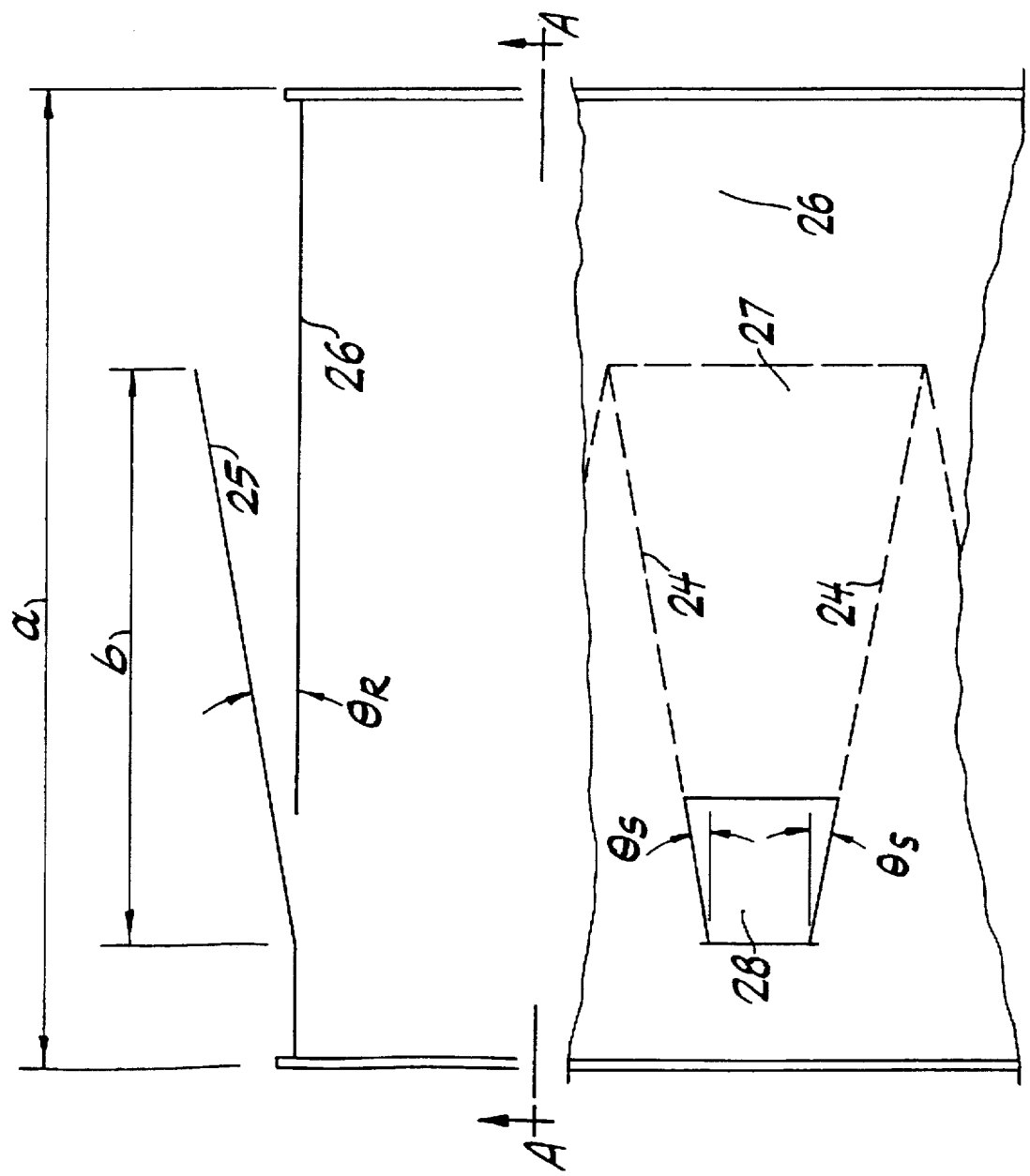

FIG. 4 is an illustration of a typical chamber of the core flow expansion chamber device of the present invention.

Figure 5:
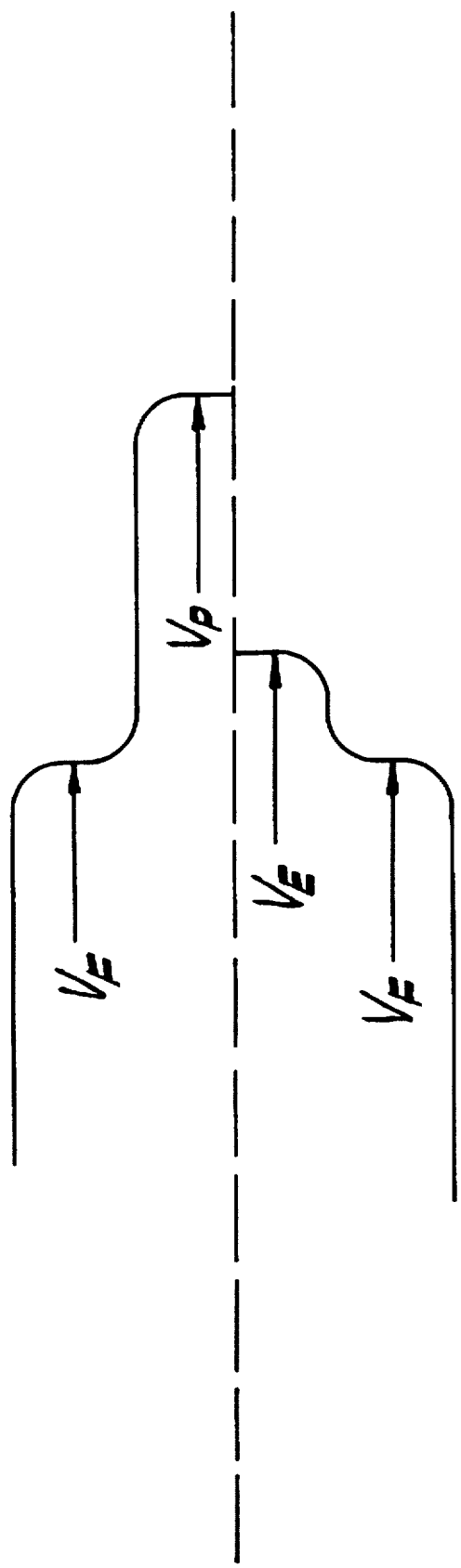

FIG. 5 is a diagram illustrating the gas velocity downstream of the core flow expansion chamber device according to the present invention.

Figure 6:
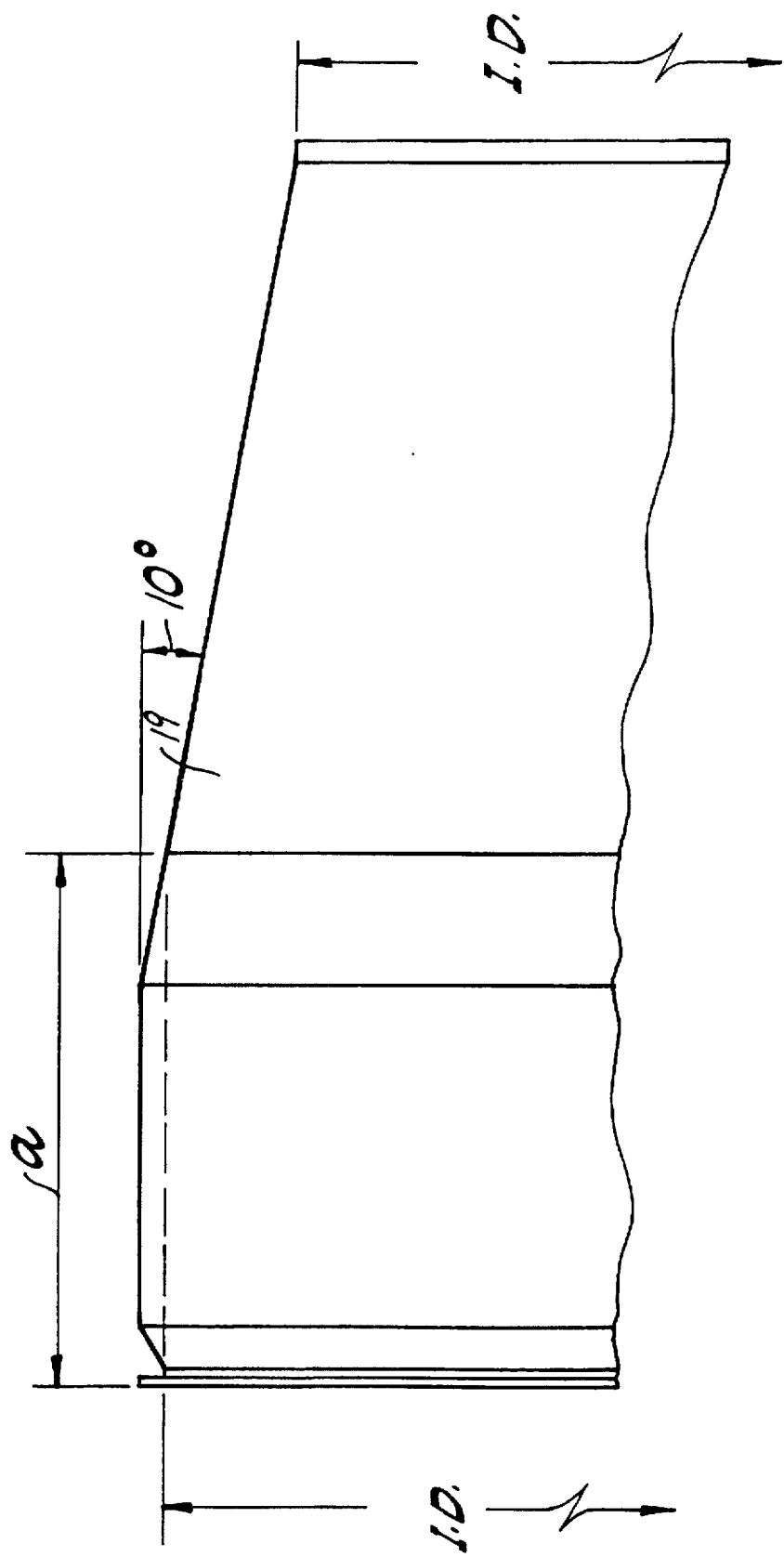

FIG. 6 is a partial view illustrating the tailpipe of the present invention.

FIG. 7 is an illustration of a fan blade of an engine.

FIG. 8 is an illustration of the recontouring required to a fan blade leading edge according to the present invention.

Figure 9:
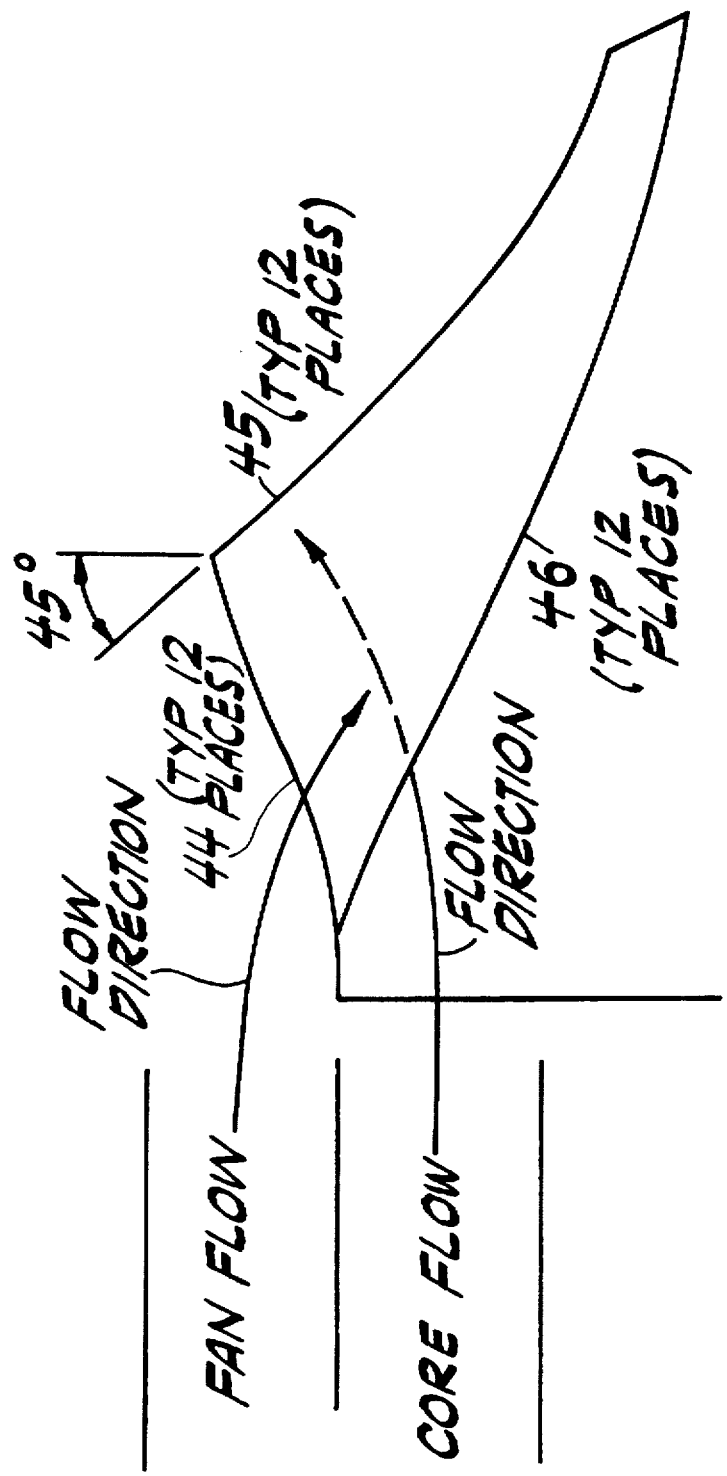

FIG. 9 is an illustration of a typical hot and cold chute of the flow diverter device of the present invention.

DESCRIPTION OF THE PREFERRED EMBODIMENT

Reference will now be made in detail to the presently preferred embodiment of the invention as illustrated in the accompanying drawings, wherein like reference numbers designate like or corresponding parts throughout the several drawings.

The preferred embodiment of the elements of the noise suppression system of the present invention have been sized for fit up on a Pratt & Whitney JT8D engine which is used, for example, on Douglas Corporation DC-9 and Boeing 737-100 and 737-200 aircraft. A description of the retrofit system of the preferred embodiment of the invention will therefore be described with specific reference to that engine. However, it will be recognized by persons skilled in the art that the present invention can be applied to other gas turbine bypass engines.

FIG. 1 illustrates an exploded view of the noise suppression system of the present invention as it fits on the JT8D engine in a configuration usable on the Douglass Corporation DC-9 or Boeing 737-100 or 737-200 aircraft. The system is generally referenced as 1. Core engine 10 includes high and low pressure compressors, a combustor, and a high and low pressure turbine aligned in a series flow relationship. An upstream fan 11 precedes core engine 10 in the engine configuration. Core engine 10 includes an outer casing which defines an annular bypass duct between the outer casing and the inner casing surrounding the components of the core engine. Fan 11 is used to move a stream of air through the bypass duct of the engine.

Noise suppression system 1 includes a device 12 for reducing noise emanating from the fan 11 known in the art as a respaced inlet guide vane or RIGV. This device removes the guide vanes controlling air entering fan 11 to a greater distance from fan 11 by means of a longer acoustically treated duct, thereby dissipating wake pressure pulses striking the fan 11 and reducing noise.

Noise suppression system 1 further includes an acoustically treated nose cowl 13 conventional for the engine, a modified fan 11, a flow diverter 14, a flow diverter support ring 16, a core flow expansion chamber device 17, a thrust reverser 18, and an acoustically treated and modified tailpipe 19.

As will be described below, the addition of the flow diverter 14 and the elements of the present invention modifies the inherent gas flow pattern and the dynamics of the engine. To compensate for this modification in the gas flow and engine dynamics, the leading edges of the fan blades 37 are modified to recontour the leading edge of the fan blade and, if necessary, to decrease clearances at the mid-span shroud 38. As shown generally in FIG. 1, the fan 11 includes a plurality of fan blades 37 which are fixed to the fan hub in a conventional manner. As shown generally in FIG. 8, when modifying a conventional engine, the leading edge 39 of each fan blade 37 is modified per the engine manufacturer's instructions by a special tool to create, by rechamfering, a new leading edge profile, or contour 40. In addition to the modification of the blade shape, the length of each mid-span shroud 38, shown generally in FIG. 7, must be checked and, if necessary, brought up to blueprint specifications.

Noise suppression system 1 includes flow diverter means for directing fan air into the exhaust gas flow path downstream of the core engine and for directing exhaust gas flow into the core flow expansion chamber device 17. Shown generally in FIG. 9, as embodied herein and in accordance with the invention, the flow diverter means comprises a flow diverter 14 which in the preferred embodiment includes twelve circumferentially spaced axially and radially elongated lobes 44 which define alternating hot and cold chutes.

The flow diverter 14 has a plurality of alternating hot gas ducts 45 and cold gas ducts 46. Flow from the fan 11 enters into the cold gas ducts 46 which incline radially inward. The bypass gas is therefore directed toward the axis of the engine. Exhaust gas from the core of the engine flows through the hot gas ducts 45 which have a greater cross sectional area and incline outward in a radial direction thereby directing the core exhaust gas into the openings in the core flow expansion chamber device. A means for supporting and positioning the flow diverter 14 in the form of a flow diverter mount ring 16 are also included.

As described more fully below, the core flow expansion chamber device 17 reduces peak velocity of the exhaust stream and therefore reduces jet noise. Since thrust noise is a function of the peak velocity of the exhaust gas raised to the eighth power, even slight reductions in the peak overall jet velocity result in a significant lowering of the engine thrust noise. FIG. 5 illustrates by a comparative diagram the velocity reduction achieved by the core flow expansion chamber device system.

The system of the present invention is designed to provide the optimum noise reduction without adversely affecting the engine efficiency. An example of the core flow expansion chamber device 17 is shown in FIGS. 2, 3 and 4. As embodied herein and in accordance with the invention, the core flow expansion chamber device 17 in the preferred embodiment is comprised of a cylindrical section 26 approximately 30 inches in length (a) and twelve circumferentially spaced exhaust chutes 27 aligned with the hot gas ducts of the flow diverter 14 through which exhaust gas from the core of the engine flows. Openings 28 in the wall of the cylindrical section 26 of the core flow expansion chamber device 17 are arranged at the points where the eflux from the hot gas ducts 45 of the flow diverter 14 would impinge on the cylindrical section 26. These openings 28 form the entrance to the twelve circumferentially spaced exhaust chutes 27. The openings 28 are sized to allow the amount of gases passing through the hot gas ducts 45 of the flow diverter 14 to flow into the exhaust chutes 27. In the JT8D, for example, the openings 28 are sized at approximately 354.8 square inches (approximately 29.6 square inches per opening 28).

Rearward of the opening 28 to the chute 27 the radially outer portion ("roof") 25 of the chute moves radially outward from the cylindrical section 26 ("floor") at an angle of approximately 10 degrees to the point where the distance between the I.D. of the "roof" 25 and the "floor" 26 is approximately 3 inches. Further, the side walls 24 of the chutes 27 move outward from the axial center line of the chutes 27 at an angle of approximately 10.3 degrees. This movement outward of the "roof" 25 and side walls 24 of the chute results in a constant increase in the cross sectional area of the chute 27 yielding a progressive increase in the containment volume of the chute 27. This constant increase in volume results in the gradual, constant expansion of the gas entering the chute 27, resulting in a slowing of the core flow velocity prior to the exhaust gas being expelled into the atmosphere through the chute exit 29.

It will be recognized by those schooled in the art that the chute exit 29 may appear at the point of largest chute 27 cross sectional area or the chute 27 may proceed further rearward at a constant cross sectional area prior to allowing the exhaust gases to flow into the atmosphere.

In the preferred embodiment, the core flow expansion chamber device 17 of the present invention is acoustically treated by the addition of sound deadening material to the interior surfaces of the cylindrical 26 and chute 27 sections. This material is added to attenuate turbo-machinery noise and serves to reduce noise during the operation of the engine. However, it will be recognized by those schooled in the art that the addition of sound deadening material to the interior surfaces of the cylindrical 26 and chute 27 sections may not be necessary for all jet engines on which the device is utilized.

Noise suppression system 1 further includes a modified tailpipe assembly 19 which is configured to have a smaller cross sectional area in the exit plane to accommodate decreased pressure in the flow stream caused by introduction of the various components, primarily the core flow expansion chamber device 17. With reference to FIG. 6, the modified tailpipe 19 for the JT8D engine has an inside inlet diameter of 34.36 inches and an inside exhaust diameter of approximately 21.25 inches. As shown in FIG. 6, the tailpipe is cylindrical in shape for approximately 19.72 inches (a) and then angles inwardly at an angle of approximately 10 degrees to form a cone. Tailpipe assembly 19 preferably is also outfitted with acoustic inner walls so as to further suppress noise.

Additional advantages and modifications will readily occur to those skilled in the art. Thus, the invention in its broader aspects is not limited to the specific details, representative devices and illustrative examples shown and described.

Accordingly, departures may be made from such detail without departing from the spirit or scope of the general inventive concept as defined by the appended claims and their equivalents.

What is claimed is:

1. A noise reduction system for modifying a fan jet engine, the noise reduction system comprising:
    (a) a flow diverter assembly having an upstream end and a downstream end, the flow diverter assembly having an annular flow diverter wall axially extending from the upstream end to the downstream end, the annular flow diverter wall being formed into a plurality of circumferentially alternating radially inward and radially outward lobes, the radially inward lobes defining cold chutes for radially inwardly diverting fan air, and the radially outward lobes defining hot chutes for radially outwardly diverting exhaust gas; and
    (b) a core flow expansion chamber device at the downstream end of the flow diverter assembly, the core flow expansion chamber device being designed for expanding and slowing exhaust gas diverted radially outwardly by the flow diverter assembly.

2. A noise reduction system as claimed in claim 1, wherein the core flow expansion chamber is treated with a sound deadening material.

3. A noise reduction system as claimed in claim 1, wherein the core flow expansion chamber device has at least one exhaust chute for expanding and slowing exhaust gas diverted radially outwardly by the flow diverter assembly.

4. A noise reduction system as claimed in claim 1, wherein the core flow expansion chamber device comprises a plurality of circumferentially spaced exhaust chutes for expanding and slowing exhaust gas diverted radially outwardly by the flow diverter assembly.

5. A noise reduction system as claimed in claim 4, wherein the core flow expansion chamber device further comprises a main body portion from which the plurality of circumferentially spaced exhaust chutes extend, wherein each exhaust chute has a roof projecting from the main body portion of the core flow expansion chamber.

6. A noise reduction system as claimed in claim 5, wherein the main body portion of the core flow expansion chamber is a cylindrical portion.

7. A noise reduction system as claimed in claim 5, wherein the roof of each exhaust chute forms an angle of about 10 degrees from a longitudinal axis of the fan jet engine.

8. A noise reduction system as claimed in claim 4, wherein each of the circumferentially spaced exhaust chutes of the core flow expansion chamber device is aligned with a radially outward lobe of the flow diverter assembly for receiving radially outwardly diverted exhaust gas.

* * * * *